(12) United States Patent
Biswas et al.

(10) Patent No.: US 11,979,264 B1
(45) Date of Patent: May 7, 2024

(54) HIGH-SPEED SERIAL LINK SIGNAL CHAIN

(71) Applicant: Cadence Design Systems, Inc., San Jose, CA (US)

(72) Inventors: Riju Biswas, Noida (IN); Abhishek Shrivastava, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 18/092,756

(22) Filed: Jan. 3, 2023

(51) Int. Cl.
*H04L 25/03* (2006.01)
(52) U.S. Cl.
CPC .. *H04L 25/03878* (2013.01); *H04L 25/03057* (2013.01)
(58) Field of Classification Search
CPC ............ H04L 25/03878; H04L 25/03057
See application file for complete search history.

(56) References Cited

U.S. PATENT DOCUMENTS

| 10,771,108 | B1 * | 9/2020 | Fazeel | H01L 27/0629 |
| 11,228,468 | B2 * | 1/2022 | Hidaka | H04L 25/03878 |
| 11,665,031 | B1 * | 5/2023 | Perisetty | H04B 1/18 |
| | | | | 375/222 |

* cited by examiner

*Primary Examiner* — Dac V Ha
(74) *Attorney, Agent, or Firm* — Schwegman Lundberg & Woessner, P.A.

(57) ABSTRACT

Methods and systems are provided for processing a signal over a serial link. The methods and systems receive, by an adjustable filter, a serial input signal, the adjustable filter configured to set a corner frequency of a channel response and a gain of the channel response, the adjustable filter adding a zero to the channel response before to a pole of the serial input signal. The methods and systems selectively apply, by a bandwidth booster component, compensation to signal attenuation of the serial input signal in a first mode of operation and of one or more test signals in a second mode of operation of a serial link receiver. The methods and systems generate, by one or more continuous time linear equalizers configured to receive on an output of the bandwidth booster, one or more output signals of the receiver based on an output signal from the bandwidth booster component.

20 Claims, 9 Drawing Sheets

HIGH-SPEED SERIAL LINK SIGNAL CHAIN

TECHNICAL FIELD

The present disclosure generally relates to the technical field of circuit design and integrated circuits (ICs). In particular, the present disclosure addresses systems and methods for applying a transfer function to adjust an overall channel response in a high-speed serial link receiver.

BACKGROUND

An IC layout specifies portions of various components of an IC. An IC typically includes a large number of registers, latches, flip-flops multipliers, and/or other types of clocked devices. Certain IC layouts are used to operate a high-speed serial link receiver. Such receivers implement a transfer function in which the peak frequency of the signal chain is set to fs/2, where fs is the data speed and is referred to as the Nyquist frequency. Usually, the overall gain achieved by such devices is reduced past the Nyquist frequency which defines the overall bandwidth of the devices.

BRIEF DESCRIPTION OF THE DRAWINGS

To easily identify the discussion of any particular element or operation, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Figure 1:
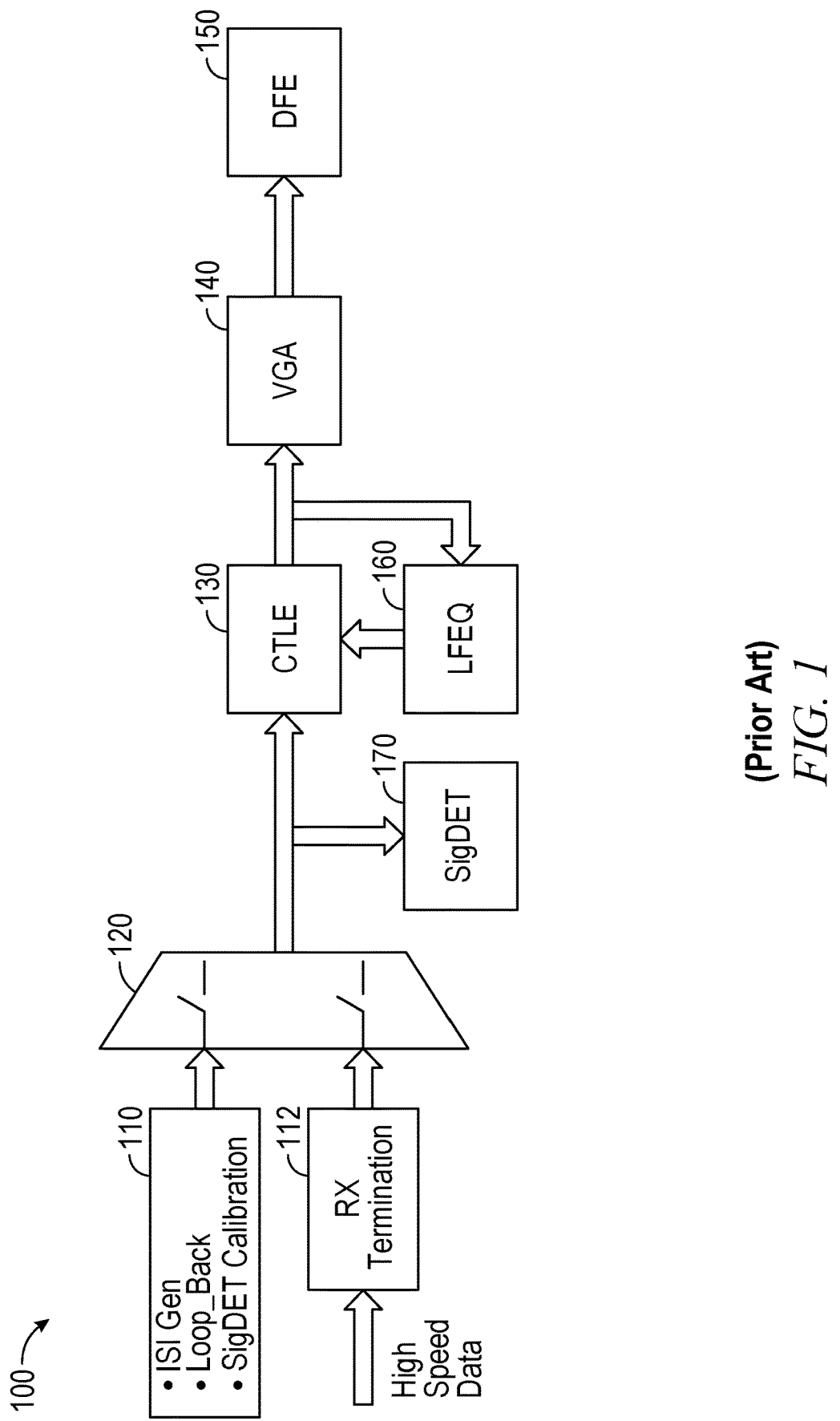
FIG. 1 illustrates a conventional high-speed serial link receiver.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Electronic design automation (EDA) software systems commonly perform signal-processing operations. Some signal-processing operations are performed by high-speed serial link receivers that handle communication of serial data signals between different physical components. In many cases, the high-speed serial data signals can range in speed up to 32 gigabits per second (Gbps) data rates. In operation, conventional high-speed serial link receivers implement a continuous time linear equalizer (CTLE) at the front-end of the receivers to achieve the peaking Nyquist frequency in the channel response. Particularly, the CTLE, when multiplied by the received signal, can modify the range of channel response of the signal from being a straight or approximately straight line that decreases in amplitude over higher frequencies to cover a wider range of frequencies before degrading in amplitude up to the Nyquist frequency. Ideally, to achieve the peaking Nyquist frequency, the bandwidth of the signal-processing chain is greater than the Nyquist frequency.

In some conventional systems, after applying the CTLE to the received signal, a low-frequency equalization (LFEQ) in the analog domain is applied to further modify the channel response. Particularly, the LFEQ can equalize certain portions of the channel that are adversely affected by application of the CTLE. This can be used to ensure less variation is present in the overall channel response achieved by the high-speed serial link receiver.

Typically, the high-speed serial link receivers support multiple modes of operation. One mode of operation involves the high-speed serial link receiver operating on a received high-speed serial link signal. Another mode of operation typically provided by the receivers is a testing mode in which one or more testing signals are applied and processed by the serial link receiver. Alternating between the different modes of operation typically involves placing a selection circuit (e.g., an isolation switch, one or more transistors or a multiplexer) in the signal path between the received high-speed serial link signal, the one or more testing signals, and components of the receiver, such as the CTLE and the LFEQ. However, because the CTLE and the LFEQ are specifically designed to achieve a certain channel response, any additional component, such as the selection circuit in the signal path can degrade and adversely impact the overall channel response. Namely, the selection circuit placed in the signal path can add resistance and capacitance (e.g., parasitic capacitance) to the overall signal path which can shift the range of the channel response applied by the CTLE and the LFEQ. As a result, the conventional high-speed serial link receivers fail to provide the ideal channel response and have reduced bandwidth. For example, if the zero introduced by the CTLE and/or the LFEQ is moved to be less than a pole of the serial link signal that is received, equalization fails to be achieved and signals may be processed with errors or not at all. This causes undesirable operations in the various operating modes, particularly because the selection circuit (e.g., the isolation switch) becomes a bottleneck in high-seed interface design.

In addition, because the capacitance and/or resistance introduced by the selection circuit varies over time and temperature, the operation of the high-speed receivers becomes unpredictable and difficult to design. This increases complexities, cost and time in designing the high-speed serial link receivers. In addition, including the LFEQ in the feedback path to the CTLE in the conventional systems, the bandwidth of the CTLE is restricted and lowered which further adversely impacts the overall operation of the receivers. Namely, routing and gate capacitance increases in the CTLE due to the LFEQ present in the signal path, which impacts the bandwidth that is achieved.

Embodiments of the present disclosure are directed to a circuit design and system that implement techniques for improving the channel response and transfer function of a high-speed serial receiver. The disclosed techniques also enable the high-speed serial receiver to selectively operate in different modes of operation without placing a selection circuit in the signal path of the high-speed serial input signal. This significantly improves the overall channel response provided by the disclosed system and reduces the overall design complexities and unpredictability due to temperature fluctuations. Particularly, the disclosed techniques relate to a serial link receiver including a plurality of receiver components operatively coupled to adjust a channel response of a serial input signal. The plurality of receiver components includes an adjustable filter operative to receive a serial input signal and set a corner frequency of the channel response and a gain of the channel response. The adjustable filter adds a zero to the channel response before a pole of the serial input signal. The plurality of components includes a bandwidth booster component that is configured to receive the serial input signal via a gate of a first transistor in a first mode of operation of the serial link receiver. The bandwidth booster component is configured to receive one or more test signals via a gate of a second transistor in a second mode of operation of the serial link receiver and compensate for signal attenuation associated with the adjustable filter in the channel response. The plurality of components includes one or more CTLEs operatively coupled to an output signal of the bandwidth booster component to generate an output of the serial link receiver.

In some examples, the adjustable filter adds the zero in the channel response at a specified distance away from a zero added by the one or more CTLEs. In some examples, the zero added by the adjustable filter is added after the zero of the one or more CTLEs. In some examples, the adjustable filter performs analog low frequency equalization. In some examples, the adjustable filter includes one or more adjustable resistors and one or more adjustable capacitors. In some examples, the gain set by the one or more adjustable resistors is controlled based on the one or more adjustable resistors. In some examples, the adjustable filter controls placement of the zero to the channel response based on the one or more adjustable capacitors.

In some examples, the one or more adjustable resistors are controlled by an adaptation engine during operation of the serial link receiver and the one or more adjustable capacitors are set based on a selected protocol and are unchanged by the adaptation engine during the operation of the serial link receiver. In some examples, the components include a first active device operatively coupled to the serial input signal and the gate of the first transistor, the first active device being activated during the second mode of operation of the serial link receiver to ground the serial input signal. In some examples, the components include an analog multiplexor operatively coupled to receive the one or more test signals and output the one or more test signals to the gate of the second transistor during the second mode of operation.

In some examples, the analog multiplexor operatively receives a receiver enable signal and outputs the receiver enable signal during the first mode of operation to prevent the one or more test signals from being received by the gate of the second transistor. In some examples, the one or more test signals include at least one of inter-symbol-interference signals, channel loss replication signals, loop-back signals, or calibration signals.

In some examples, the disclosed techniques include a 32 Gbps wireline receiver. In some examples, the bandwidth booster component includes a resistor coupled in series with an inductor, the resistor and inductor being coupled to a node of the first transistor and a node of the second transistor. In some examples, the node of the first transistor includes a source or drain of the first transistor and the node of the second transistor includes a source or drain of the second transistor. In some examples, the second mode of operation includes a test mode of operation of the serial link receiver.

In some examples, the techniques described herein relate to a method that receive, by an adjustable filter of a serial link receiver, a serial input signal. The adjustable filter is configured to set a corner frequency of a channel response and a gain of the channel response. The adjustable filter adds a zero to the channel response before to a pole of the serial input signal. The method selectively applies, by a bandwidth booster component, compensation to signal attenuation of the serial input signal in a first mode of operation of the serial link receiver and of one or more test signals in a second mode of operation of the serial link receiver. The method generates, by one or more CTLEs coupled to receive on an output signal of the bandwidth booster, one or more output signals of the serial link receiver.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 illustrates a conventional high-speed serial link receiver 100. The conventional high-speed serial link receiver 100 includes a receiver termination device 112, a test signal generation component 110, a selection circuit 120, a signal detector (SigDET) 170 component, a CTLE 130, an LFEQ 160, a variable gain amplifier (VGA) 140, and a decision feedback equalizer (DFE) 150. In conventional implementations, a high-speed serial signal is received and processed by the receiver termination device 112. The output of the receiver termination device 112 is provided to one input of the selection circuit 120 and one or more test signals provided by the test signal generation component 110 are received by a second input of the selection circuit 120.

In some implementations, the selection circuit 120 is an analog multiplexer and in other implementations the selection circuit 120 includes one or more isolation switches or transistors. The selection circuit 120 is configured to receive a select signal from a processor (not shown) and output either the signal received from the receiver termination device 112 or the one or more test signals received from the test signal generation component 110. The output of the selection circuit 120 is processed by the remaining components of the conventional high-speed serial link receiver 100 shown in FIG. 1. Particularly, the serial signal is processed by the CTLE 130 and the LFEQ 160 to apply a transfer function that broadens the bandwidth of the channel response. As mentioned above, the CTLE 130 converts the serial signal from having a straight line decrease in amplitude and gain over increase in frequency to having a constant amplitude and gain over a set of frequencies up to the Nyquist frequency. The LFEQ 160 applies a transfer function to correct for some drops in amplitude and gain over a narrow range of low frequencies. Together the CTLE 130 and the LFEQ 160 implement a transfer function to provide a near constant gain across a range of frequencies up to the Nyquist frequency at which point the gain and amplitude begin to decrease.

As previously mentioned, the selection circuit 120 in the signal path of the received signal output by the receiver termination device 112 introduces many design complexities and reduces the efficiency and accuracy of the transfer function implemented by the CTLE 130 and the LFEQ 160. Particularly, the transistors and active devices and components in the selection circuit 120 that are in the signal path provide additional resistance and capacitance which modifies dynamically the overall transfer function designed to be implemented by the CTLE 130 and the LFEQ 160. Because of this, the size of the transistors and active devices in the selection circuit 120 need to be very large to provide negligible parasitic capacitance and resistance which adds cost, complexity, and physical space on a physical device. The disclosed high-speed serial link receiver 200, shown in FIG. 2, addresses these issues and provides an improved receiver while still allowing for one or more test signals to be processed by the serial link receiver 200 in a selective manner with the high-speed serial signal output by the receiver termination device 112.

Figure 2:
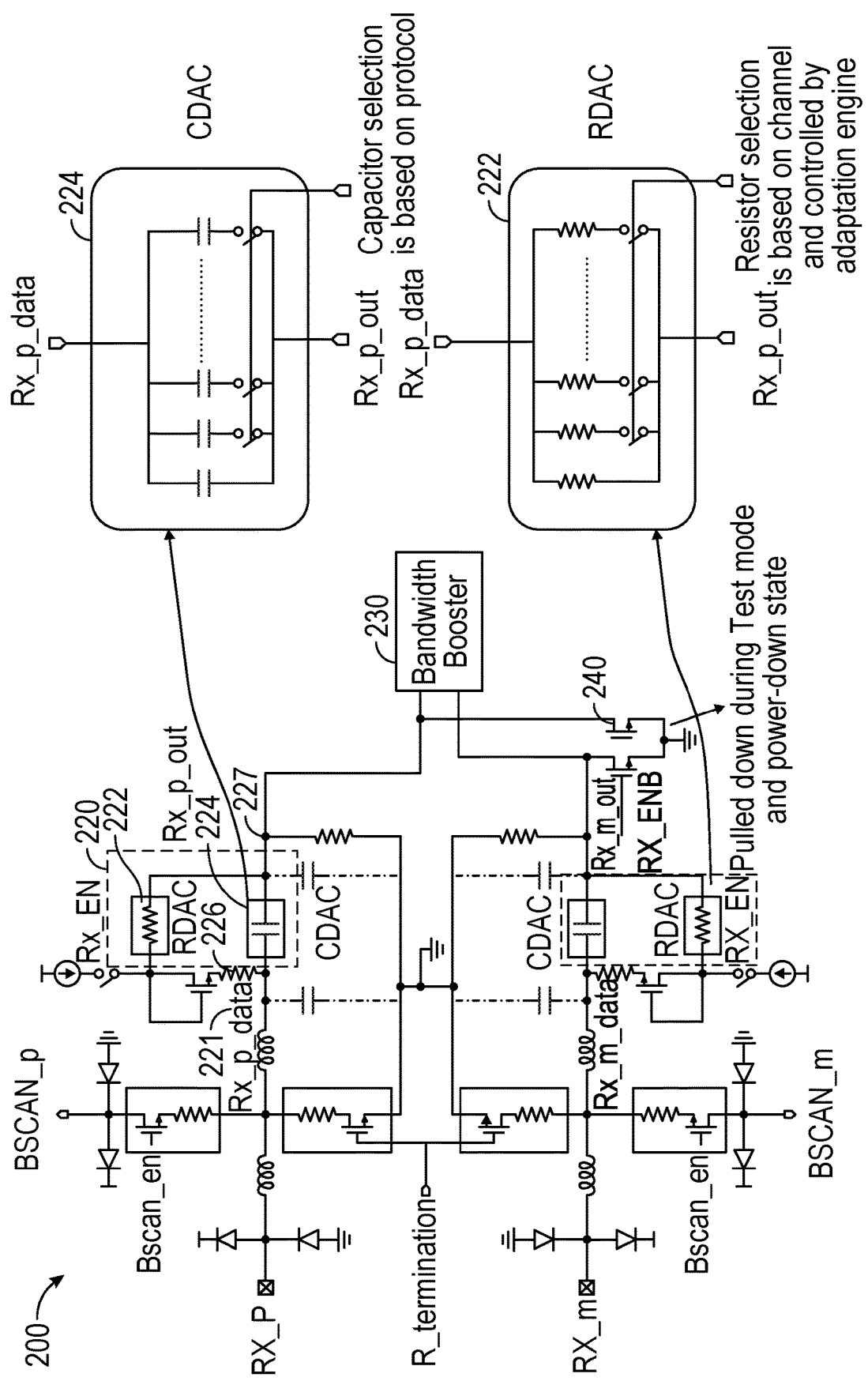
FIG. 2 is a diagram illustrating an example high-speed serial link receiver, in accordance with some embodiments.

FIG. 2 is a diagram illustrating an example high-speed serial link receiver 200, in accordance with some embodiments. The serial link receiver 200 includes differential signal paths (RX_P and RX_m) and similar components are implemented by both signal paths. For the sake of brevity, only one of the differential signal paths is described below but similar functionality applies to the other differential signal path. The serial link receiver 200 implements a 32 Gbps wireline receiver for processing a 32 Gbps serial input signal as a high-speed serial input signal.

In a first mode of operation corresponding to a normal operating mode, the serial link receiver 200 includes an RX_P high-speed serial input signal (RX_P signal) which can be provided by the receiver termination device 112. The RX_P signal passes through an input network including one or more inductors and capacitors to provide an Rx_p_data signal 221. The Rx_p_data signal 221 is passed through an adjustable filter 220 to apply a first modification to the channel response by applying a transfer function to the Rx_p_data signal.

In some cases, the adjustable filter 220 includes a set of adjustable resistors 222 (which implement a resistor digital to analog converter circuit (RDAC)) and/or a set of adjustable capacitors 224 (which implement a capacitor digital to analog converter circuit (CDAC)) to output an Rx_p_out signal 227. The resistance provided by the adjustable resistors 222 is controlled based on a signal provided by an adaptation engine (e.g., a signal processor). This resistance can be used to control a gain that is applied to the transfer function used to modify the channel response of the RX_P signal. The capacitance provided by the adjustable capacitors 224 is controlled based on a signal indicating the communication protocol being implemented by the serial link receiver 200 and, in some cases, can be provided by the adaptation engine (e.g., a signal processor). This capacitance can be used to control a zero location of the transfer function used to modify the channel response of the RX_P signal. Together, the adjustable resistors 222 and the adjustable capacitors 224 implement similar functionality as the LFEQ 160. Particularly, the adjustable filter 220 can filter the data signal 221 in a way that the zero added to the channel response is at a frequency location that is lower and precedes the frequency location of a pole of the RX_P signal.

Figure 3:
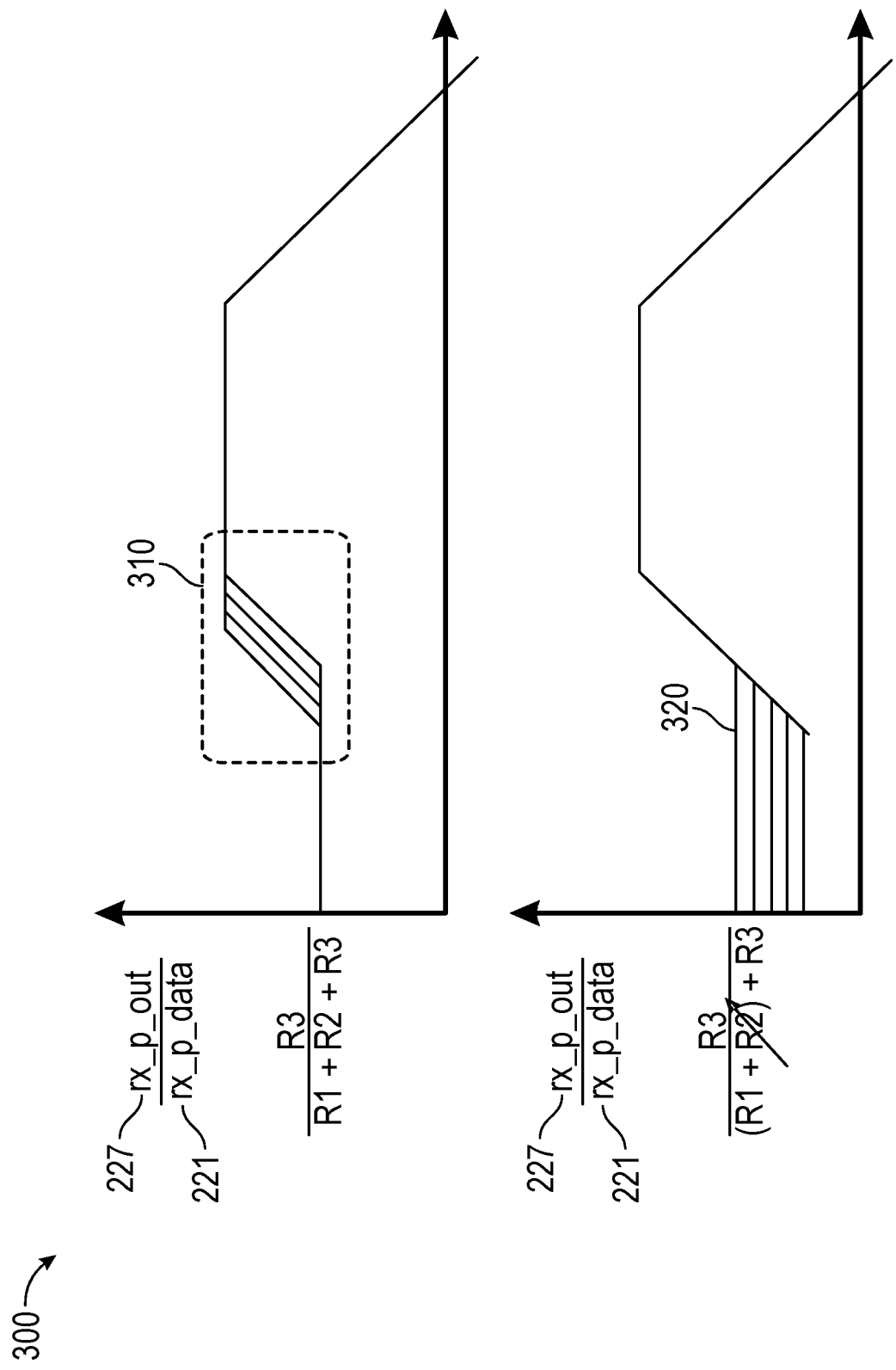
FIG. 3 is a diagram of a transfer function applied by the high-speed serial link receiver to the overall channel response, in accordance with some embodiments.

FIG. 3 is a diagram of a transfer function 300 applied by the high-speed serial link receiver to the overall channel response, in accordance with some embodiments. Specifically, the transfer function 300 is implemented by the adjustable filter 220 shown in FIG. 2. As shown, the adjustable capacitors 224 shown in FIG. 2 control in which locations 310 the zero is added to the channel response to control the frequency at which the gain provided by the adjustable resistors 222 shown in FIG. 2 is applied to the input signal. The gain is represented by the ratio of the output signal of the adjustable filter 220, Rx_p_out signal 227, to input signal of the adjustable filter 220, the Rx_p_data signal 221. The adjustable resistors 222 control the amount of gain 320 that is applied to the channel response by the transfer function and can be a function of R3/((R1+R2+R3), where R2 is the resistance of the adjustable resistors 222. R3 can correspond to resistor 226 and R1 can correspond to resistance of the input signal.

Referring to FIG. 2, after applying the adjustable filter 220 to the RX_P signal, the Rx_p_out signal 227 of the adjustable filter 220 is passed to a bandwidth booster component 230. After processing the signal by the adjustable filter 220 and the bandwidth booster component 230 the signal is processed by one or more CTLEs which multiply the filtered signal by a transfer function to convert the serial signal from having a straight line decrease in amplitude and gain over increase in frequency to having a constant amplitude and gain over a set of frequencies up to the Nyquist frequency. In some examples, the adjustable filter 220 adds the zero in the channel response at a frequency that is a specified amount greater or lower than (e.g., at a specified distance away) a frequency of a zero added by the one or more CTLEs. Namely, the zero added to the channel response by the adjustable filter 220 is added at a frequency that is greater than (e.g., after) the frequency at which the zero of the one or more CTLEs is added.

In some examples, the adaptation engine or processing device receives an instruction to place the serial link receiver 200 in a second mode of operation corresponding to a test mode in which one or more test signals are processed by a subset of components of the serial link receiver 200 instead of the RX_P signal. In such cases, the processing device or adaptation engine applies an RX_ENB signal to a gate of an active device 240 (e.g., a transistor). A first node (e.g., a source or drain) of the active device 240 can be coupled to the Rx_p_out signal 227 of the adjustable filter 220 that is being provided to the bandwidth booster component 230. A second node (e.g., a source or drain) of the active device 240 can be coupled to ground. In response to receiving the RX_ENB signal that represents activation of the second mode of operation, the active device 240 couples the Rx_p_out signal 227 from the adjustable filter 220 to ground. This prevents the RX_P signal from being processed by the bandwidth booster component 230. In such cases, the bandwidth booster component 230 receives and processes the one or more test signals corresponding to the second mode of operation. Since the active device 240 being used to perform the switching of the mode of operation of the serial link receiver 200 is not in the signal path between the RX_P signal and the adjustable filter 220 and the one or more CTLEs, the parasitic capacitance and resistance of the active device 240 does not adversely affect the transfer function applied by the adjustable filter 220 and the one or more CTLEs to the channel response. The active device 240 can be a very small active component, which reduces the overall complexities and time needed to design and manufacture the serial link receiver 200 relative to the conventional high-speed serial link receiver 100.

Figure 4:
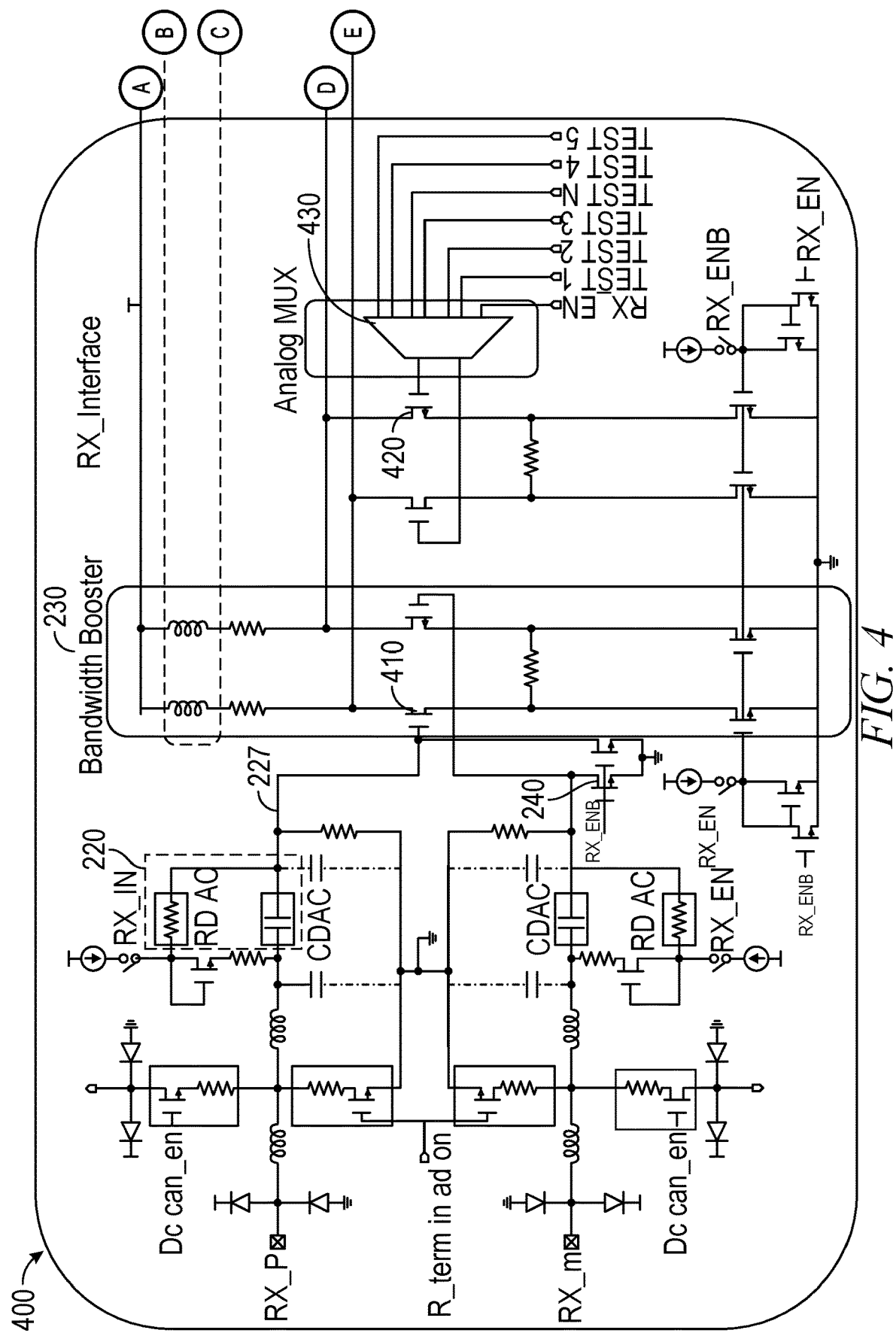
FIG. 4 is a diagram illustrating an example high-speed serial link receiver, in accordance with some embodiments.
Figure 4:
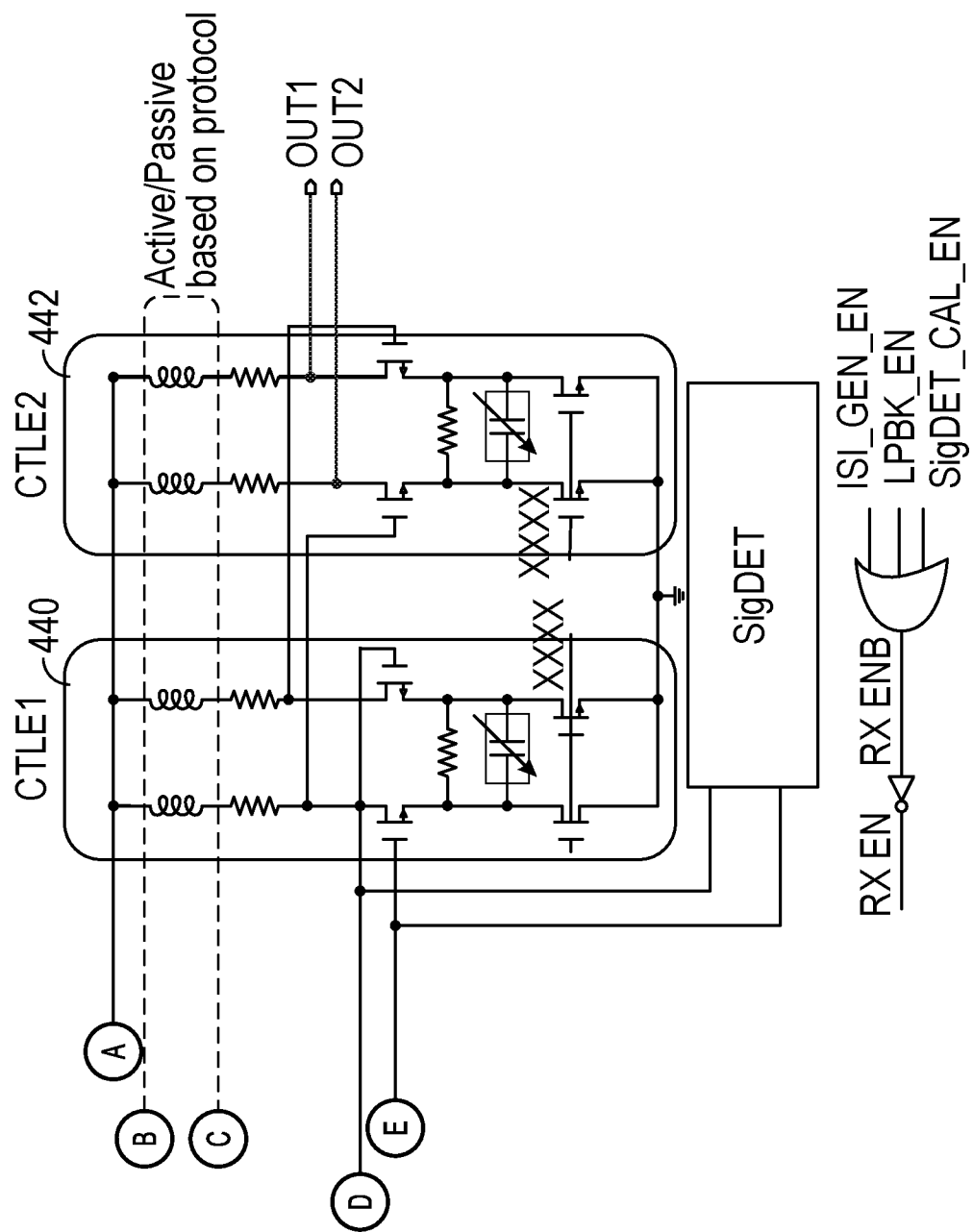

FIG. 4 is a diagram illustrating an example high-speed serial link receiver 400, in accordance with some embodiments. High-speed serial link receiver 400 is similar to the serial link receiver 200 but shows the bandwidth booster component 230 in more detail along with a first CTLE1 440 and a second CTLE2 442 that are placed in the signal path of the RX_P signal. Similar components among the serial link receiver 200 and the high-speed serial link receiver 400 are similarly labeled and perform the same functions, as previously discussed.

The bandwidth booster component 230 includes a transistor 410 coupled in series with a resistor and an inductor. The gate of the transistor 410 receives the Rx_p_out signal 227 from the adjustable filter 220. A source or drain of the transistor 410 is coupled to the first CTLE1 440 and an output of the first CTLE2 440 is coupled to the second CTLE2 442. The output of the second CTLE2 442 provides the signal processed by the high-speed serial link receiver 400 to which the transfer function implemented by the high-speed serial link receiver 400 has been applied to modify the overall channel response. The bandwidth booster component 230 uses the inductor of the bandwidth booster component 230 to provide extra boost to the bandwidth of the overall channel response. The inductor of the bandwidth booster component 230 and/or in any of the other components, such as the first CTLE1 440 and the second CTLE2 442, can be an active device or a passive device. In some examples, the zero added by the bandwidth booster component 230 is placed in the channel response at a frequency close to the Nyquist frequency and does not interfere with zeros added by other components, such as the adjustable filter 220, the first CTLE1 440, and/or the second CTLE2 442. In some cases, the bandwidth booster component 230 can be used to replace one or more of the first CTLE1 440 and the second CTLE 442. Namely, the bandwidth booster component 230 can perform similar functions as the first CTLE1 440 and the second CTLE2 442 and can be designed to add a zero to the channel response in a similar manner as one or more of the first CTLE1 440 and the second CTLE2 442. This can further reduce the number of components, expense, and complexity in designing and implementing the high-speed serial link receiver 400.

In some examples, the high-speed serial link receiver 400 includes an analog or digital multiplexer 430. The analog or digital multiplexer 430 receives one or more test signals, such as one or more inter-symbol-interference signals, one or more channel loss replication signals, one or more loop-back signals, and/or one or more calibration signals. The analog or digital multiplexer 430 receives a select signal from a processor (not shown) that selects which of the one or more test signals to apply to the bandwidth booster component 230, the first CTLE1 440, and/or the second CTLE2 442 during the second mode of operation. While the high-speed serial link receiver 400 operates in the first mode of operation, the analog or digital multiplexer 430 can output an RX_EN signal to indicate that the second mode of operation is disabled and which deactivates a transistor 420 and decouples the analog or digital multiplexer 430 from the signal path of the RX_P signal processed by the adjustable filter 220 and the bandwidth booster component 230.

During the second mode of operation, the active device 240 couples the signal corresponding to the input signal RX_P that has been processed by the adjustable filter 220 to ground and the bandwidth booster component 230 receives one or more test signals that are output from the analog or digital multiplexer 430 via a gate of the transistor 420.

Figure 5:
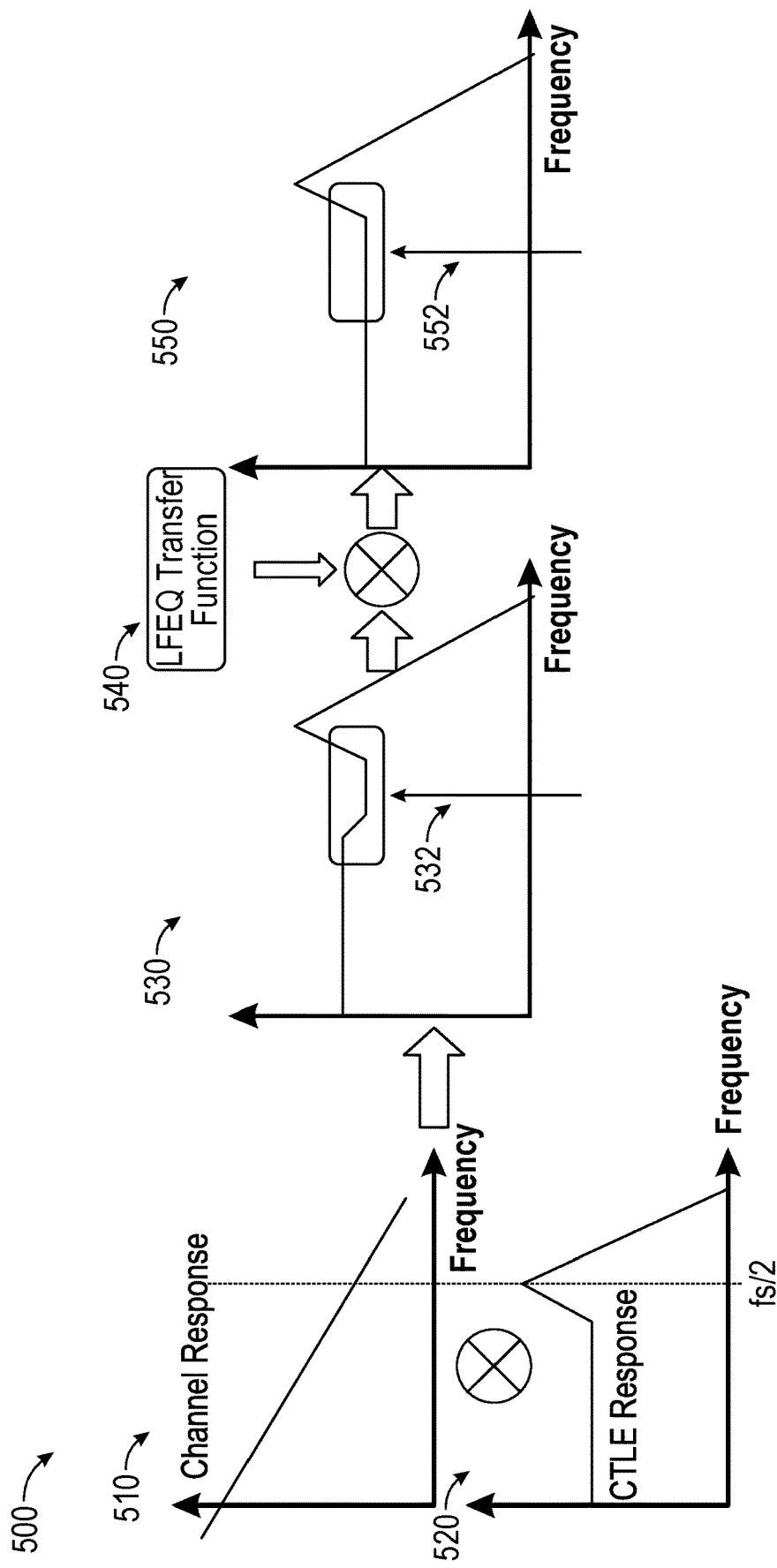
FIGS. 5 and 6 illustrate example graphs of transfer functions implemented by the high-speed serial link receiver, in accordance with some embodiments.
Figure 6:
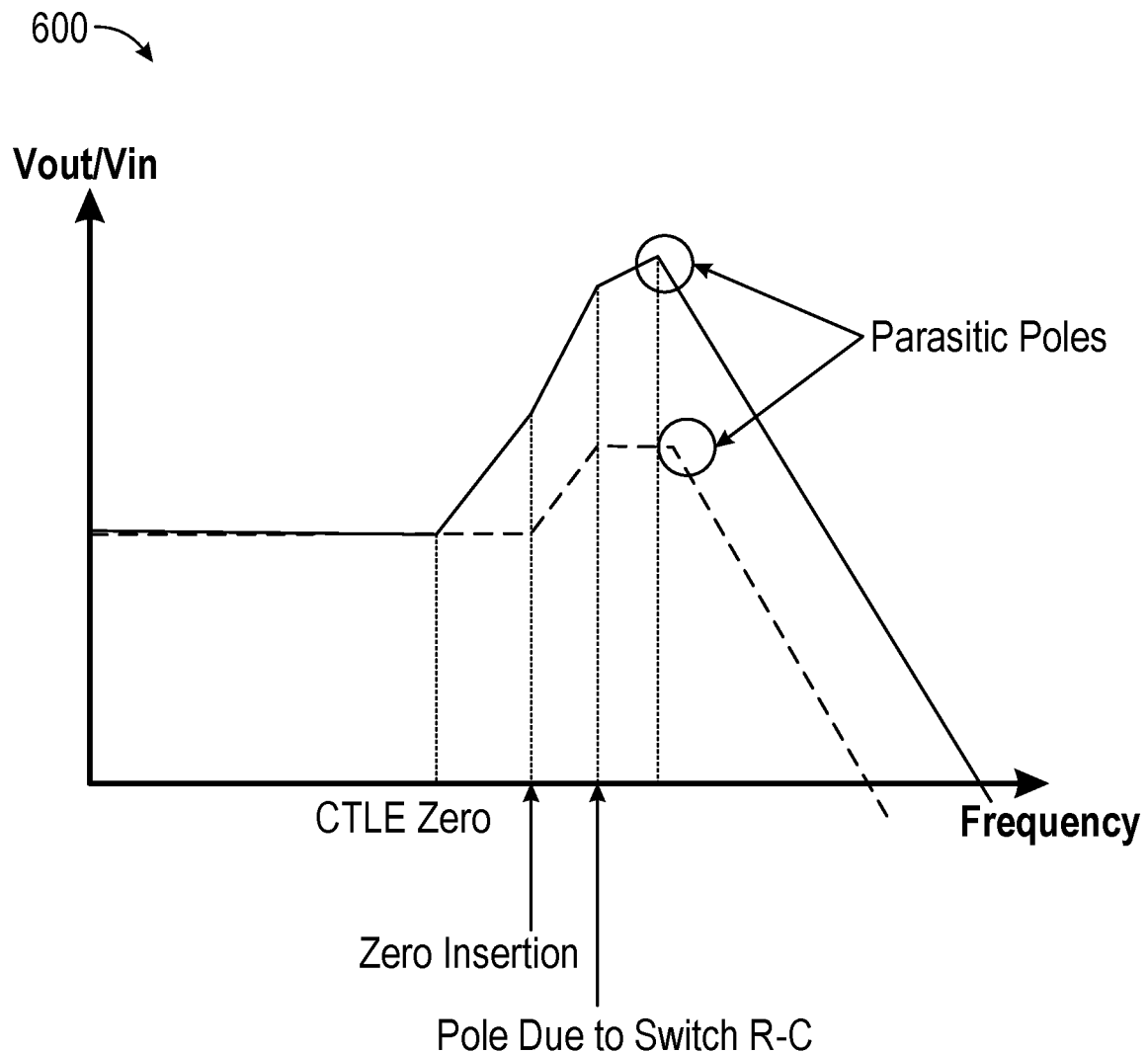

FIGS. 5 and 6 illustrate example diagrams 500 and 600 of transfer functions implemented by the high-speed serial link receiver 400, in accordance with some embodiments. Specifically, graph 500 shows a channel response 510 of the high-speed serial input signal before a transfer function is applied to the input signal by the high-speed serial link receiver 400. As shown, the channel response 510 linearly decreases the gain/amplitude as the frequency is increased. The channel response 510 is multiplied by the booster component 230, the first CTLE 440, and/or the second CTLE 442 which can implement the transfer function 520. This results in a modified channel response 530. As shown, the modified channel response 530 includes a set of frequencies 532 for which the gain/amplitude is reduced relative to the gain at the Nyquist frequency and lower frequencies. The adjustable filter 220 implements the LFEQ transfer function 540 that is applied to the modified channel response 530 to address and provide gain to the set of frequencies 532. The resulting overall channel response 550 shows the channel response of the input signal after having the transfer function of the booster component 230, the first CTLE 440, and/or the second CTLE 442 and the adjustable filter 220 applied including correction to gain of the set of frequencies 552. The diagram 600 in FIG. 6 shows the location of the zeros inserted by the illustrated example in diagram 500 relative to the pole of the received signal.

Figure 7:
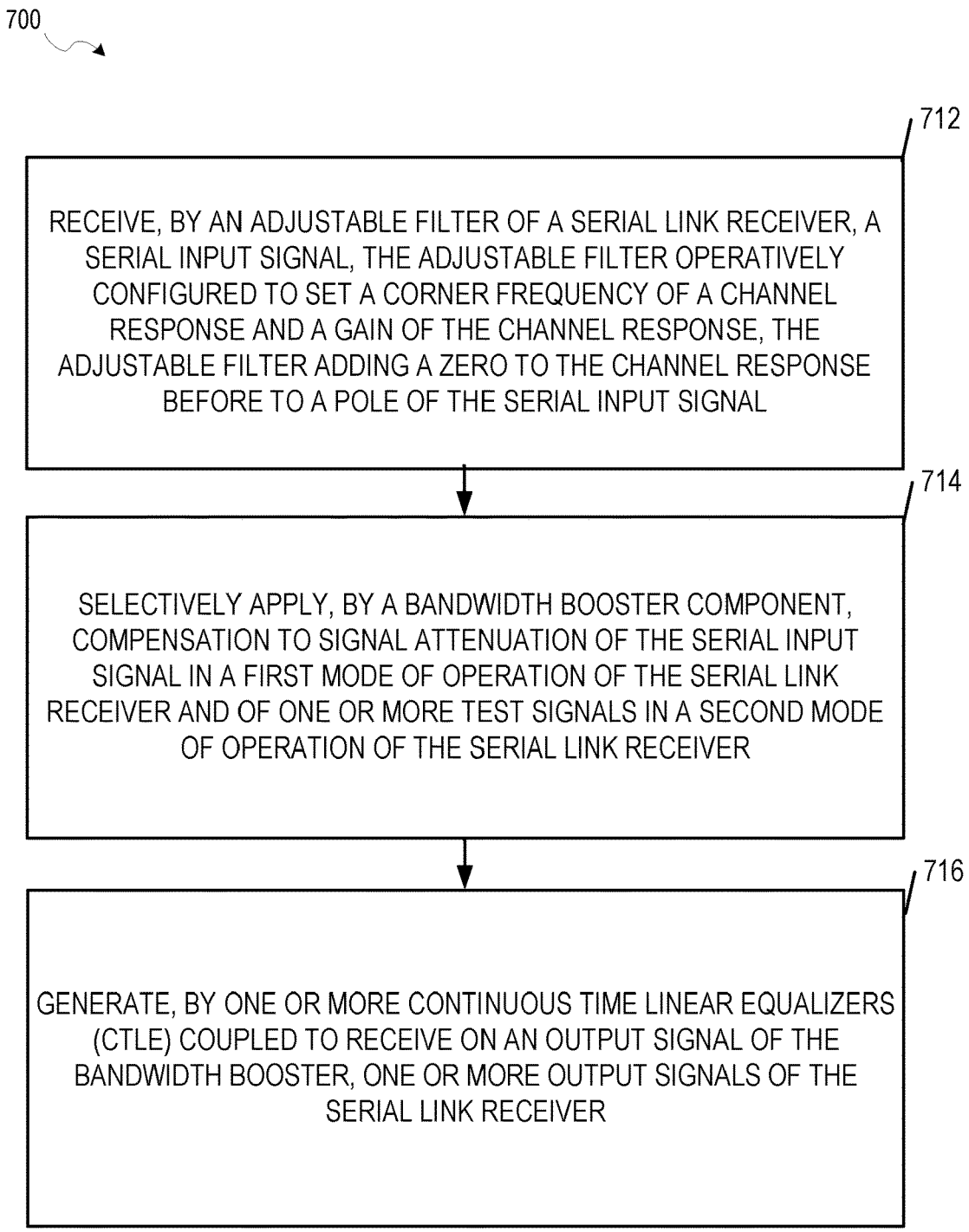
FIG. 7 illustrates an example method for applying a transfer function to a channel response in a high-speed serial link receiver, in accordance with some embodiments.

FIG. 7 illustrates an example method 700 for applying a transfer function to a channel response in a high-speed serial link receiver, in accordance with some embodiments. The method 700 begins with operation 712 where an adjustable filter of a serial link receiver receives a serial input signal, the adjustable filter operatively configured to set a corner frequency of a channel response and a gain of the channel response, the adjustable filter adding a zero to the channel response before to a pole of the serial input signal. Then, at operation 714, a bandwidth booster component selectively applies compensation to signal attenuation of the serial input signal in a first mode of operation of the serial link receiver and of one or more test signals in a second mode of operation of the serial link receiver and, at operation 716, one or more output signals of the serial link receiver are generated by one or more continuous time linear equalizers (CTLEs) coupled to receive on an output signal of the bandwidth booster.

Figure 8:
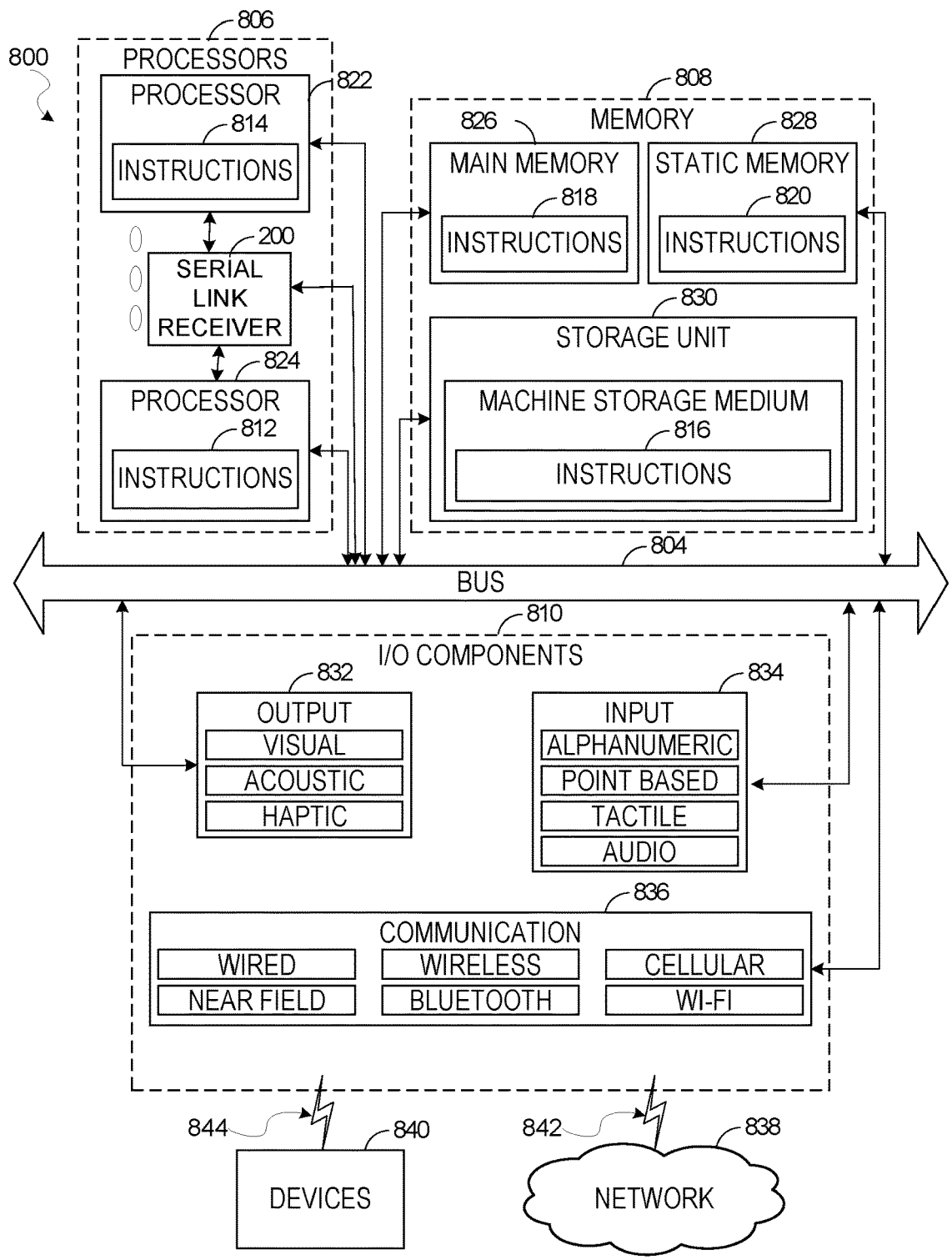
FIG. 8 is a functional block diagram of an example computing system for carrying out methods and operations described herein, in accordance with some embodiments of the present disclosure.

FIG. 8 is a functional block diagram of a computing system 800 for executing method 700 and other processes described above, along with other embodiments of the present disclosure. The computing system 800 may execute an EDA software system and for performing the method 700, and other processes described above, in accordance with some embodiments of the present disclosure. A machine is shown in the form of a computer system within which a set of instructions may be executed for causing the machine to perform any one or more of the method 700 and other methodologies discussed herein, according to some embodiments. Specifically, FIG. 8 shows a diagrammatic representation of the machine in the example form of a computer system. The machine may include a bus 804, processors 806, memory 808, and I/O components 810, which may be configured to communicate with each other such as via the bus. The machine may include instructions 812-820 (e.g., software, a program, an application, an applet, an app, or other executable code) for causing the machine to perform any one or more of the methodologies discussed herein may be executed. For example, the instructions 812-820 may cause the machine to execute an EDA software system that executes the above processes described in the above description. The instructions 812-820 transform the general, non-programmed machine into a particular machine programmed to carry out the described and illustrated functions in the manner described here. In alternative embodiments, the machine operates as a standalone device or may be coupled (e.g., networked) to other machines. In a networked deployment, the machine may operate in the capacity of a server machine or a client machine in a server-client network environment, or as a peer machine in a peer-to-peer (or distributed) network environment. The machine may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 812-820, sequentially or otherwise, that specify actions to be taken by the machine. Further, while only a single machine is illustrated, the term "machine" shall also be taken to include a collection of machines that individually or jointly execute the instructions 812-820 to perform any one or more of the methodologies discussed herein.

The computing system 800 includes the serial link receiver 200, discussed above. The serial link receiver 200 can be included in some or all of the components shown in FIG. 8 to enable high-speed communication between the components.

In an example embodiment, the processors 806 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 822 and a processor 824 that may execute the instructions 814, 812. The term "processor" is intended to include multi-core processors 806 that may comprise two or more independent processors (sometimes referred to as "cores") that may execute instructions contemporaneously. Although FIG. 8 shows multiple processors 806, the machine may include a single processor with a single core, a single processor with multiple cores (e.g., a multi-core processor), multiple processors with a single core, multiple processors with multiple cores, or any combination thereof.

The memory 808 may include a main memory 826, a static memory 828, and a storage unit 830, both accessible to the processors 806 such as via the bus 804. The main memory 826, the static memory 828, and the storage unit 830 store the instructions 816-820 embodying any one or more of the processes, methodologies or functions described herein. The instructions 812-820 may also reside, completely or partially, within the main memory 826, within the static memory 828, within the storage unit 820, within at least one of the processors 806 (e.g., within the processor's cache memory), or any suitable combination thereof, during execution thereof by the machine.

The I/O components 810 may include a wide variety of components to receive input, provide output, produce output, transmit information, exchange information, capture measurements, and so on. The specific I/O components 810 that are included in a particular machine will depend on the type of machine. For example, portable machines such as mobile phones will likely include a touch input device or other such input mechanisms, while a headless server machine will likely not include such a touch input device. It will be appreciated that the I/O components 810 may include many other components that are not shown in FIG. 8. The I/O components 810 are grouped according to functionality merely for simplifying the following discussion and the grouping is in no way limiting. In various example embodiments, the I/O components 810 may include output components 832 and input components 834. The output components 832 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 834 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 810 may include communication components 836 operable to couple the machine to a network 838 or devices 840 via a coupling 842 and a coupling 844, respectively. For example, the communication components 836 may include a network interface component or another suitable device to interface with the network 838. In further examples, the communication components 836 may include wired communication components, wireless communication components, cellular communication components, and other communication components to provide communication via other modalities. The devices 840 may be another machine or any of a wide variety of peripheral devices (e.g., a peripheral device coupled via a universal serial bus (USB)).

Executable Instructions and Machine Storage Medium

The various memories (e.g., 808, 818, 820 and/or memory of the processor(s) 806, 822, 824) and/or the storage unit 830 may store one or more sets of instructions and data structures (e.g., software) embodying or utilized by any one or more of the methodologies or functions described herein. These instructions, when executed by the processor(s) 806, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 838 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 838 or a portion of the network 838 may include a wireless or cellular network, and the coupling 842 may be a Code Division Multiple Access (CDMA) connection, a Global System for Mobile communications (GSM) connection, or another type of cellular or wireless coupling. In this example, the coupling 842 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 812-820 may be transmitted or received over the network 938 using a transmission medium via a network interface device (e.g., a network interface component included in the communication components 836) and utilizing any one of a number of well-known transfer protocols (e.g., hypertext transfer protocol (HTTP)). Similarly, the instructions 812-820 may be transmitted or received using a transmission medium via the coupling 844 (e.g., a peer-to-peer coupling) to the devices 840. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 812-820 for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media (non-transitory computer readable media or medium) and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, method or process that includes elements in addition to those listed after such a term in a claim is still deemed to fall within the scope of that claim.

What is claimed is:

1. A receiver comprising:
   an adjustable filter configured to receive a serial input signal and to set a corner frequency of a channel response and a gain of the channel response, the adjustable filter adding a zero to the channel response before a pole of the serial input signal;
   first and second transistors for controlling a mode of operation of the receiver;
   a bandwidth booster component operatively coupled to the adjustable filter and configured to receive the serial input signal, after adjustment by the adjustable filter, via a gate of the first transistor when the receiver is in a first mode of operation, the bandwidth booster component configured to receive one or more test signals via a gate of the second transistor when the receiver is in a second mode of operation, and the bandwidth booster compensating for signal attenuation caused by the adjustable filter in the channel response; and
   one or more continuous time linear equalizers (CTLEs) operatively coupled to an output of the bandwidth booster component and configured to generate an output of the receiver based on an output signal of the bandwidth booster component.

2. The receiver of claim 1, wherein the adjustable filter adds the zero in the channel response at a specified distance away from a zero added by the one or more CTLEs.

3. The receiver of claim 2, wherein the zero added by the adjustable filter is added after the zero of the one or more CTLEs.

4. The receiver of claim 1, wherein the adjustable filter performs analog low frequency equalization.

5. The receiver of claim 1, wherein the adjustable filter comprises one or more adjustable resistors and one or more adjustable capacitors.

6. The receiver of claim 5, wherein the gain is controlled by based on the one or more adjustable resistors.

7. The receiver of claim 5, wherein the adjustable filter controls placement of the zero in the channel response based on the one or more adjustable capacitors.

8. The receiver of claim 7, wherein the one or more adjustable resistors are controlled by an adaptation engine during operation of the receiver, and wherein the one or more adjustable capacitors are set based on a selected protocol and are unchanged by the adaptation engine during the operation of the receiver.

9. The receiver of claim 1, comprising a first active device operatively coupled to the gate of the first transistor and an output of the adjustable filter, the first active device being activated when the receiver is operating in the second mode of operation to ground the serial input signal.

10. The receiver of claim 9, comprising an analog multiplexor operatively configured to receive the one or more test signals and output the one or more test signals to the gate of the second transistor when the receiver is operating in the second mode.

11. The receiver of claim 10, wherein the analog multiplexor is configured to receive a receiver enable signal and to output the receiver enable signal during the first mode of operation to prevent the one or more test signals from being received by the gate of the second transistor.

12. The receiver of claim 1, wherein the one or more test signals include at least one of inter-symbol-interference signals, channel loss replication signals, loop-back signals, or calibration signals.

13. The receiver of claim 1, wherein the receiver is a 32 gigabits per second (Gbps) serial link wireline receiver.

14. The receiver of claim 1, wherein the bandwidth booster component comprises a resistor coupled in series with an inductor, the resistor and inductor being coupled to a node of the first transistor and a node of the second transistor.

15. The receiver of claim 14, wherein the node of the first transistor comprises a source or a drain of the first transistor, and the node of the second transistor comprises a source or a drain of the second transistor.

16. The receiver of claim 1, wherein the second mode of operation comprises a test mode of operation of the receiver.

17. A method comprising:
   receiving, by an adjustable filter of a receiver, a serial input signal, the adjustable filter configured to set a corner frequency of a channel response and a gain of the channel response, the adjustable filter adding a zero to the channel response before to a pole of the serial input signal;
   selectively applying, by a bandwidth booster component, compensation to signal attenuation of the serial input signal after adjustment by the adjustable filter when the receiver is in a first mode of operation and of one or more test signals when the receiver is in a second mode of operation; and
   generating, by one or more continuous time linear equalizers (CTLEs) coupled to an output of the bandwidth booster component, one or more output signals of the receiver based on an output signal of the bandwidth booster component.

18. The method of claim 17, wherein the adjustable filter adds the zero in the channel response at a specified distance away from a zero added by the one or more CTLEs.

19. The method of claim 18, wherein the zero added by the adjustable filter is added after the zero of the one or more CTLEs.

20. An apparatus comprising:
   means for receiving, by an adjustable filter of a receiver, a serial input signal, the adjustable filter configured to set a corner frequency of a channel response and a gain of the channel response, the adjustable filter adding a zero to the channel response before to a pole of the serial input signal;
   means for selectively applying, by a bandwidth booster component, compensation to signal attenuation of the serial input signal after adjustment by the adjustable filter when the receiver is in a first mode of operation and of one or more test signals when the receiver is in a second mode of operation; and means for generating, by one or more continuous time linear equalizers (CTLEs) coupled to an output of the bandwidth booster component, one or more output signals of the receiver based on an output signal of the bandwidth booster component.

* * * * *